(12) United States Patent
Nizar et al.

(10) Patent No.: US 6,470,238 B1
(45) Date of Patent: *Oct. 22, 2002

(54) METHOD AND APPARATUS TO CONTROL DEVICE TEMPERATURE

(75) Inventors: Puthiya K. Nizar, El Dorado Hills; David J. McDonnell, Fair Oaks; Brian K. Langendorf, El Dorado Hills; Michael G. LaTondre, Fair Oaks; Jeff L. Rabe, Gold River; Tom A. Sutera; Zohar Bogin, both of Folsom; Vincent E. VonBokern, Rescue, all of CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/335,101

(22) Filed: Jun. 17, 1999

Related U.S. Application Data

(63) Continuation-in-part of application No. 08/990,711, filed on Dec. 15, 1997, now Pat. No. 6,173,217, which is a continuation-in-part of application No. 08/979,835, filed on Nov. 26, 1997, now Pat. No. 5,953,685.

(51) Int. Cl.[7] ............................................... G05D 23/00
(52) U.S. Cl. ........................ 700/299; 700/153; 702/130
(58) Field of Search .......................... 700/299, 71, 153, 700/202, 204–205; 702/130, 136, 132; 710/36, 48, 49, 15

(56) References Cited

U.S. PATENT DOCUMENTS

| | | | |
|---|---|---|---|
| 5,265,099 A | * 11/1993 | Feinstein | 714/718 |
| 5,590,061 A | * 12/1996 | Hollowell, II et al. | 702/130 |
| 5,721,837 A | 2/1998 | Kikinis et al. | 702/99 |
| 5,732,215 A | 3/1998 | Boutaghou et al. | 702/150 |
| 5,784,328 A | 7/1998 | Irrinki et al. | 365/222 |
| 5,798,918 A | 8/1998 | Georgiou et al. | 700/21 |
| 5,835,885 A | 11/1998 | Lin | 702/99 |

* cited by examiner

Primary Examiner—Leo Picard
Assistant Examiner—Kidest Bahta
(74) Attorney, Agent, or Firm—Blakely, Sokoloff, Taylor & Zafman LLP

(57) ABSTRACT

A method for controlling device temperature. The method involves determining access rate to a component, comparing the access rate with a predetermined threshold modified by a weighted value and controlling the temperature of the component through corrective action.

56 Claims, 12 Drawing Sheets

METHOD AND APPARATUS TO CONTROL DEVICE TEMPERATURE

CROSS-REFERENCES TO RELATED APPLICATIONS

This is a continuation-in-part application of U.S. patent application Ser. No. 08/990,711 filed on Dec. 15, 1997 now U.S. Pat. No. 6,173,217 which is a continuation-in-part of U.S. patent application Ser. No. 08/979,835, filed on Nov. 26, 1997 now U.S. Pat. No. 5,953,685.

BACKGROUND

1. Field of the Invention

The field of the invention relates to temperature control of components, including memory devices.

2. Related Art

New generation chipsets dissipate a significant amount of power due to higher operating frequencies and large gate counts. A significant amount of the power dissipated by newer high speed chipsets is dissipated in the I/O buffers. The power dissipation is modulated by the quantity and the pattern of data driven out from the chip's I/O buffers. Increased power dissipation results in increased package and die temperatures and therefore may lead to system failure.

SUMMARY

In brief, one embodiment of the invention relates to an apparatus comprising a device and a controller coupled to the device. The controller controls access to the device by throttling access requests to the device.

DETAILED DESCRIPTION

In one embodiment, the present invention relates to a method and apparatus for monitoring and controlling memory access rate between a core logic and memory components such that power dissipation and therefore thermal specification of the core logic is met. Herein, "core logic" includes a memory controller. "Memory components" include non-volatile and volatile memory such as synchronous dynamic random access memory (SDRAM). "Thermal specification" designates a particular component's tolerance for heat. For example, given a component, its thermal specification describes the approximate temperature at which the component is likely to slow down and/or cause system failures or to break down.

When the access rate causes excessive temperatures, a throttling function is enabled. This throttling function slows the access rate for a predetermined period of time that is sufficient to guarantee that the component's thermal specification is not exceeded.

The present invention is simple to validate and has negligible effects on component gate count.

Figure 1A:
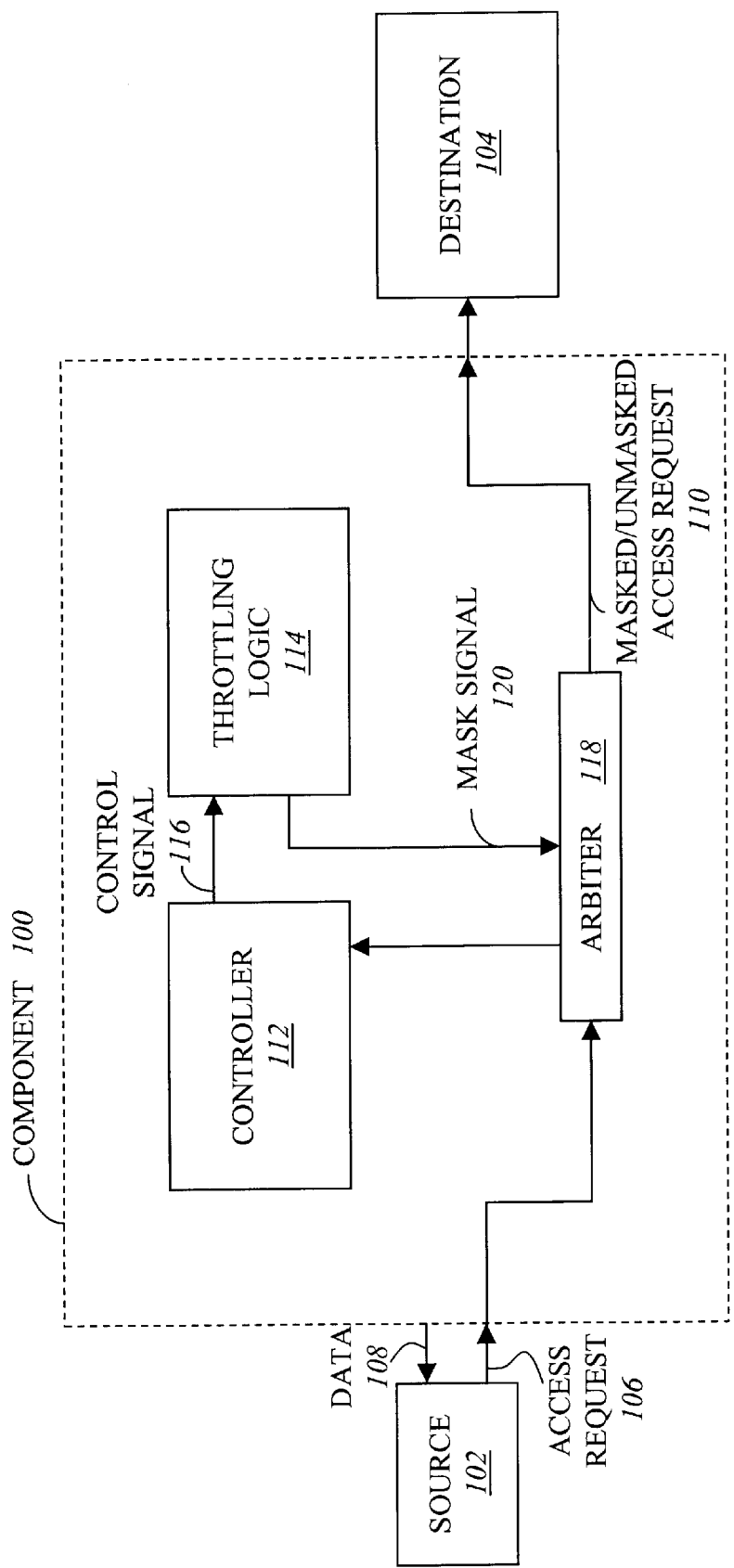
FIG. 1a is an exemplary system block diagram illustrating one embodiment of the present invention in controlling the temperature of a device by controlling the access rate to the device.

FIG. 1a is an exemplary system block diagram illustrating one embodiment of a system in which the temperature of a device is controlled by controlling the access rate to the device in the system. In such a system, the temperature of the system is reduced by reducing the access rate to the device. The access rate may be reduced by reducing the number of accesses to the device. In an alternative embodiment, the access rate may be reduced by reducing the speed at which the accesses occur. Yet in another embodiment, accesses may be reduced by stopping an access that is already being performed. In the system of the present invention, the device temperature is reduced, along with the temperature of other devices whose use is diminished due to the reduction in access rate of the device.

A component 100 controls data access rate to and from other components. In one embodiment, component 100 controls the access rate between a source 102 which generates access requests and a destination 104 to which access requests are made. In one embodiment, component 100 includes, but is not limited to, a bridge coupling various devices such as a peripheral device (e.g., a peripheral component interconnect (PCI) device), a graphics device and/or a processor to a memory device allowing data exchange between the devices. Component 100 may also be a controller for a device such as, for instance, a memory device, a graphics device, a peripheral bus device or a processor facilitating transmission of data to and from the device. Although component 100 is shown as one device, component 100 may be multiple devices.

Source 102 includes, but is not limited to, a data read/write requester which generates data read and/or write requests to destination 104. Destination 104 includes, but is not limited to, a memory device or any data source or data sink (e.g., network, processing device, storage device, etc.).

Referring still to FIG. 1a, component 100 has a controller 112 configured to monitor access request 106 which has been processed and to notify a throttling logic 114 of the processed access requests through a control signal 116. Throttling logic 114 begins throttling the access requests if the number of processed access requests is equal to or greater than a predetermined threshold. In one embodiment, throttling logic 114 begins generating a mask signal for each access request 106 when the number of processed access requests is equal to or greater than a threshold. The mask signal is then input to an arbiter 118 which masks access requests 106.

Thus, by controlling the access rate to the component and the destination, the component controls the temperature of the system and thermal violations are prevented.

Figure 1B:
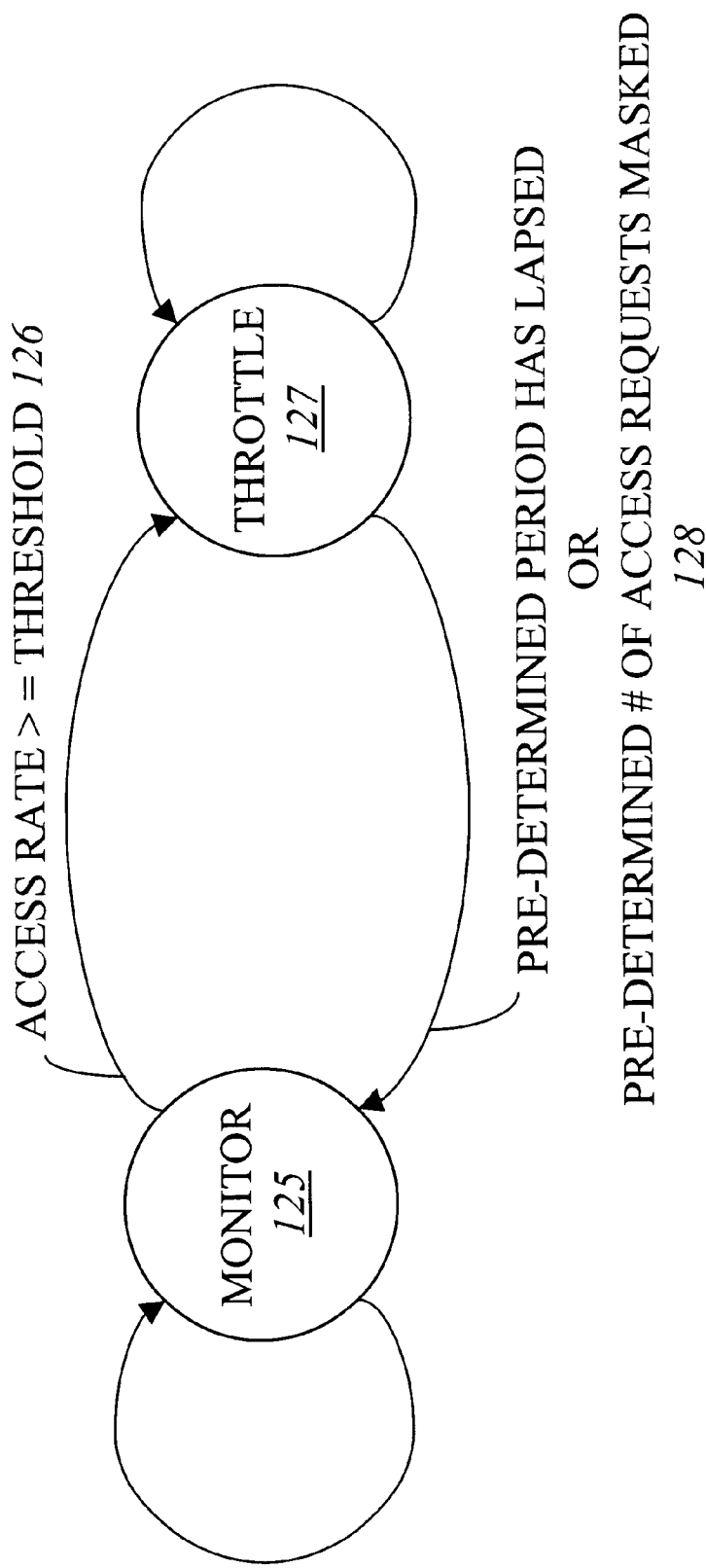
FIG. 1b is a state diagram illustrating one embodiment of the throttling logic of the present invention.

FIG. 1b is a state diagram illustrating one embodiment of throttling logic 114 of FIG. 1a. The throttling logic remains at a monitor state 125 while the number of processed access requests from a source to a destination are being monitored. If the number of processed access requests is equal to or greater than a predetermined threshold 126, the throttling logic transitions to a throttle state 127. In an alternative embodiment, if the throttling logic monitors the temperature of the device and determines that the device is approaching and/or is outside its thermal specification, or if the throttling logic receives an indication to that effect, then it transitions to throttle state 127.

In throttle state 127, the throttle logic throttles access requests from the source to the destination until a pre-determined time period has elapsed or in the alternative, a pre-determined number of access requests has been masked as represented by state transition 128. In an alternative embodiment, a pre-determined number of access requests are masked until the temperature reaches a desired level. The state then transitions back to a monitor state 125 and the cycle may be repeated.

Note that the throttling logic may be designed to throttle the device up if it is capable of accommodating more accesses and its temperature is below the specified level. In other words, the access rate to a device may be increased while the device temperature remains within its thermal specification.

Figure 1C:
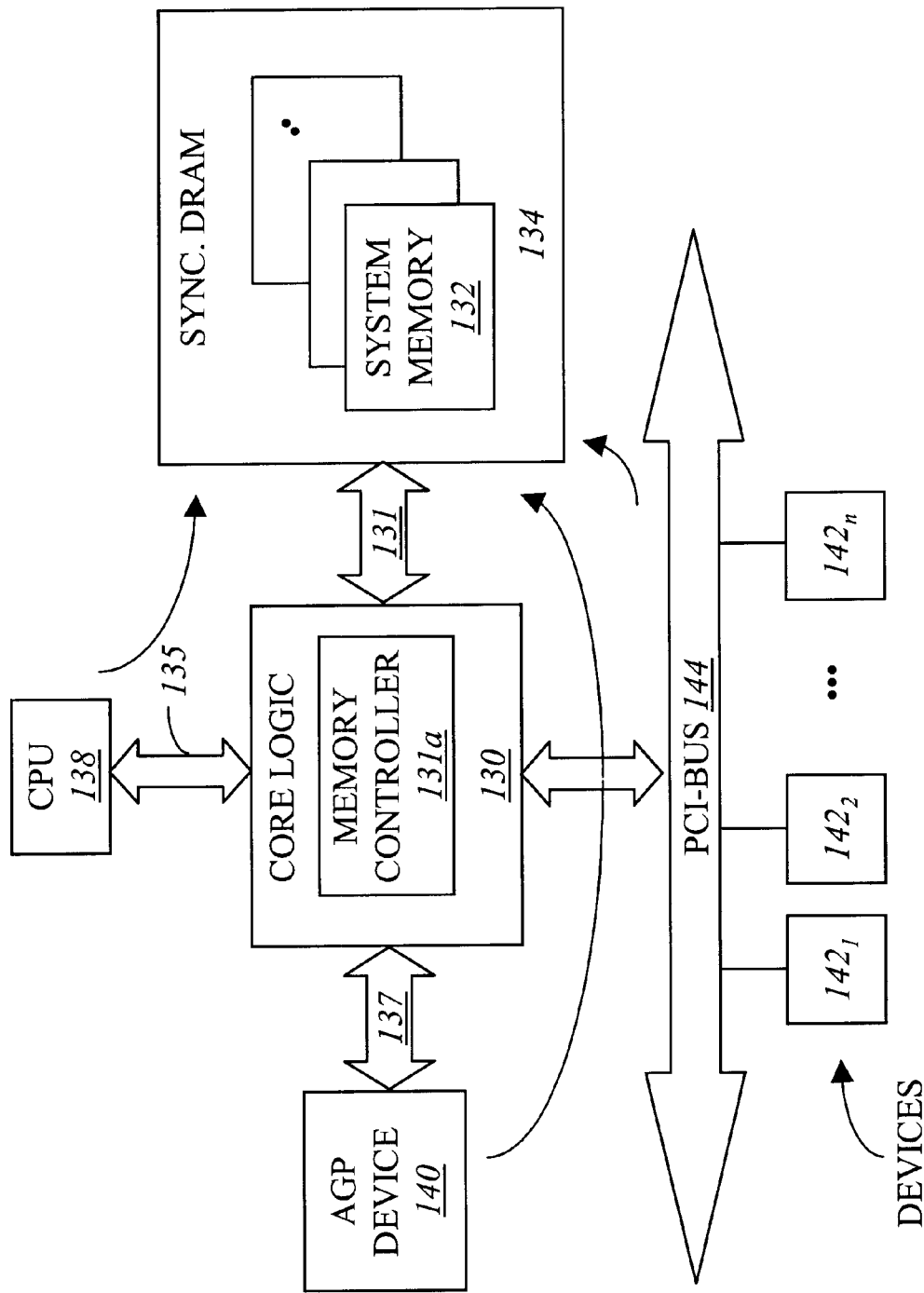
FIG. 1c illustrates an exemplary block diagram of a computer system having a core logic exposed to potential thermal violations.

FIG. 1c illustrates an exemplary block diagram of a computer system having a core logic exposed to potential thermal violations. More specifically, in one embodiment, core logic 130 has a memory controller 136 and is coupled to DRAM 134 including synchronous DRAM (SDRAM) and a system memory 132 by bus 131. Memory controller 136 couples system memory 132 and SDRAM 134 to various devices including a central processing unit (CPU) 138 such as an Intel Pentium® II processor coupled by a bus 135, an accelerated graphics port (AGP) device 140 coupled by a bus 137, and a plurality of peripheral component interconnect (PCI) devices $142_1$ through $142_N$ coupled by bus 144. Although not shown, a person skilled in the art may appreciate that the system may also include various other components typically found in a computer system.

The PCI devices $142_1$ through $142_N$ are Input/Output (I/O) hardware devices that are coupled to the system through a PCI expansion connector (not shown) or mounted to the personal computer (PC) motherboard (not shown). Examples of PCI or other I/O devices include, but are not limited to a graphic controller/card, a disk controller/card, a local area network (LAN) controller/card and a video controller/card. AGP device 140 is coupled to system memory 132 through the memory controller 136 and is designed to attempt to optimize the graphics data transfer operations in high speed personal computers.

Memory controller 136 provides CPU 138, AGP device 140 and the PCI devices $142_1$ through $142_N$ access to system memory 132. For example, on a data write transaction, a write request as well as the data to be written into system memory are passed to and processed by memory controller 136. On a read transaction, a read request is passed to memory controller 136 and the data requested is sent back from system memory 132 to the requesting components such as CPU 138, AGP device 140 and/or PCI devices $142_1$ through $142_N$.

Because of the high traffic and the high volume of data in read and write requests being processed and driven to system memory 132 by the memory controller 136, the power consumption of memory controller 136 increases. This causes a direct increase in the temperature of memory controller 136. If the temperature crosses over a certain thermal threshold as defined by the temperature specification of memory controller 136, memory controller 136 may break down, slow down and/or cause system failure. Similarly, the thermal specification of SDRAM 134 may be violated due to increased temperature on processing a high volume of read requests. Herein, the temperature of core logic 130 is controlled by monitoring data access rate through memory controller 136 to ensure that such breakdown is prevented.

Although core logic 130 is illustrated as having a memory controller 136, in another embodiment core logic 130 may also include a host bridge connecting the system memory to various components such as, for example, the CPU, peripheral interconnect (PCI) devices and the accelerated graphics port (AGP) device. In yet another embodiment, core logic 130 has one or more bus (e.g., PCI bus) controller, an graphics (e.g., AGP) controller and a CPU controller in addition to the memory controller to control data access between various components such as, for example, bus and graphics devices, the system memory and the CPU.

Figure 2A:
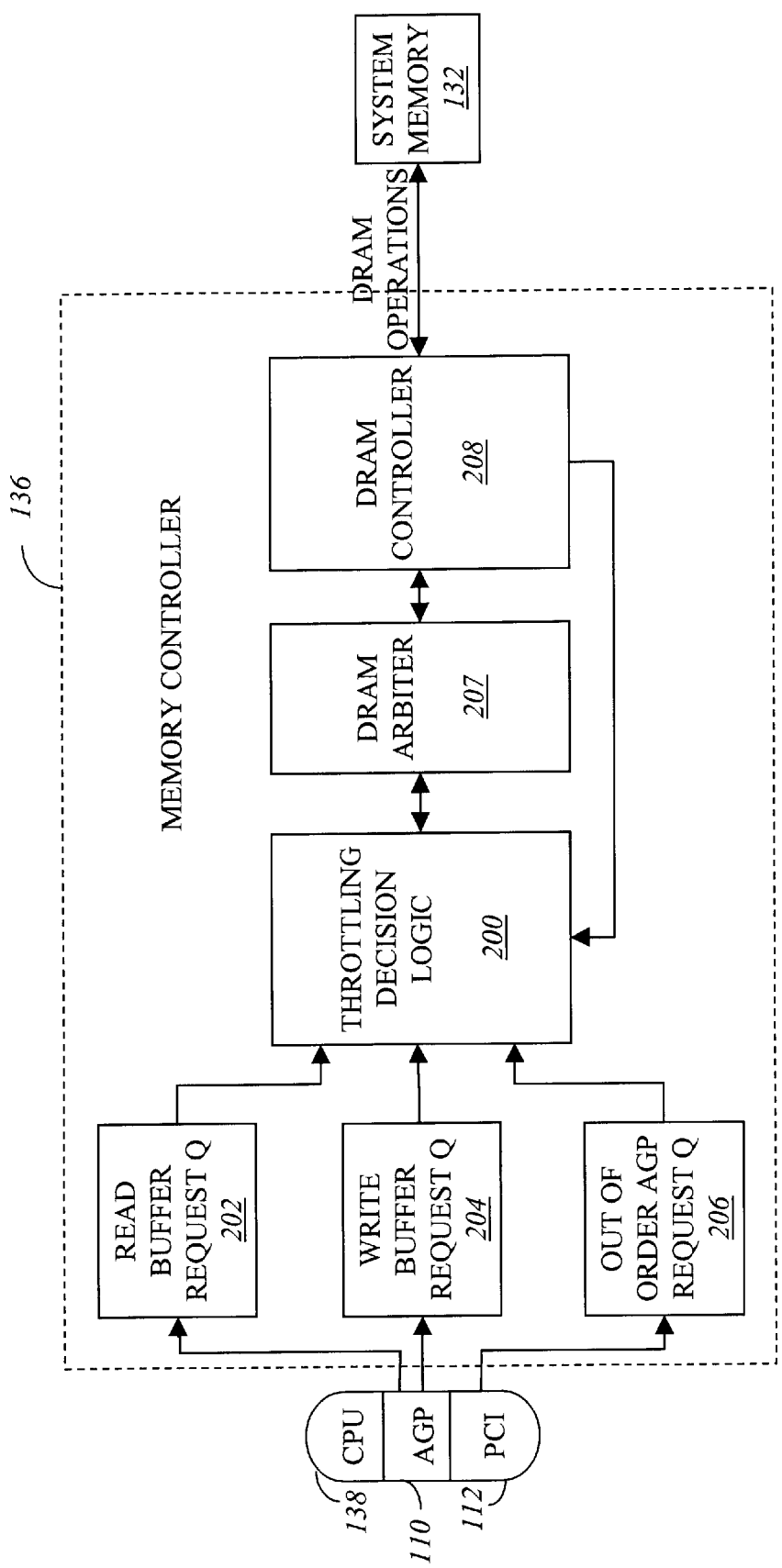
FIG. 2a is a block diagram illustrating one embodiment of a portion of the internal components comprising the memory controller illustrated in FIG. 1.

FIG. 2a is a functional block diagram of one embodiment of memory controller 136. A throttling decision logic 200 is coupled to multiple data read and write request/data queues 202, 204 and 206. Throttling decision logic 200 monitors the access rate of data transfer requests to system memory and generates signals limiting the number of data transfer requests processed when the access rate is greater than or equal to a predetermined threshold.

A read request queue 202 contains a plurality of read requests made by various system components. A write buffer request queue 204 contains a plurality of write requests made by various components of the core logic 100. An out of order AGP request queue 206 contains AGP requests made by AGP device 140.

Throttling decision logic 200 is coupled to a DRAM arbiter 207 which passes on the read/write requests to a DRAM controller 208. DRAM controller 208 performs DRAM operations, e.g. read and write requests, to system memory 132. DRAM arbiter 207 receives control signals from throttling decision logic 200 which specifies the timing and the duration that DRAM arbiter 207 is to hold up the processing of read requests to prevent thermal violations in the SDRAM and to hold up the processing of both read and write requests to prevent thermal violations in the memory controller.

Figure 2B:
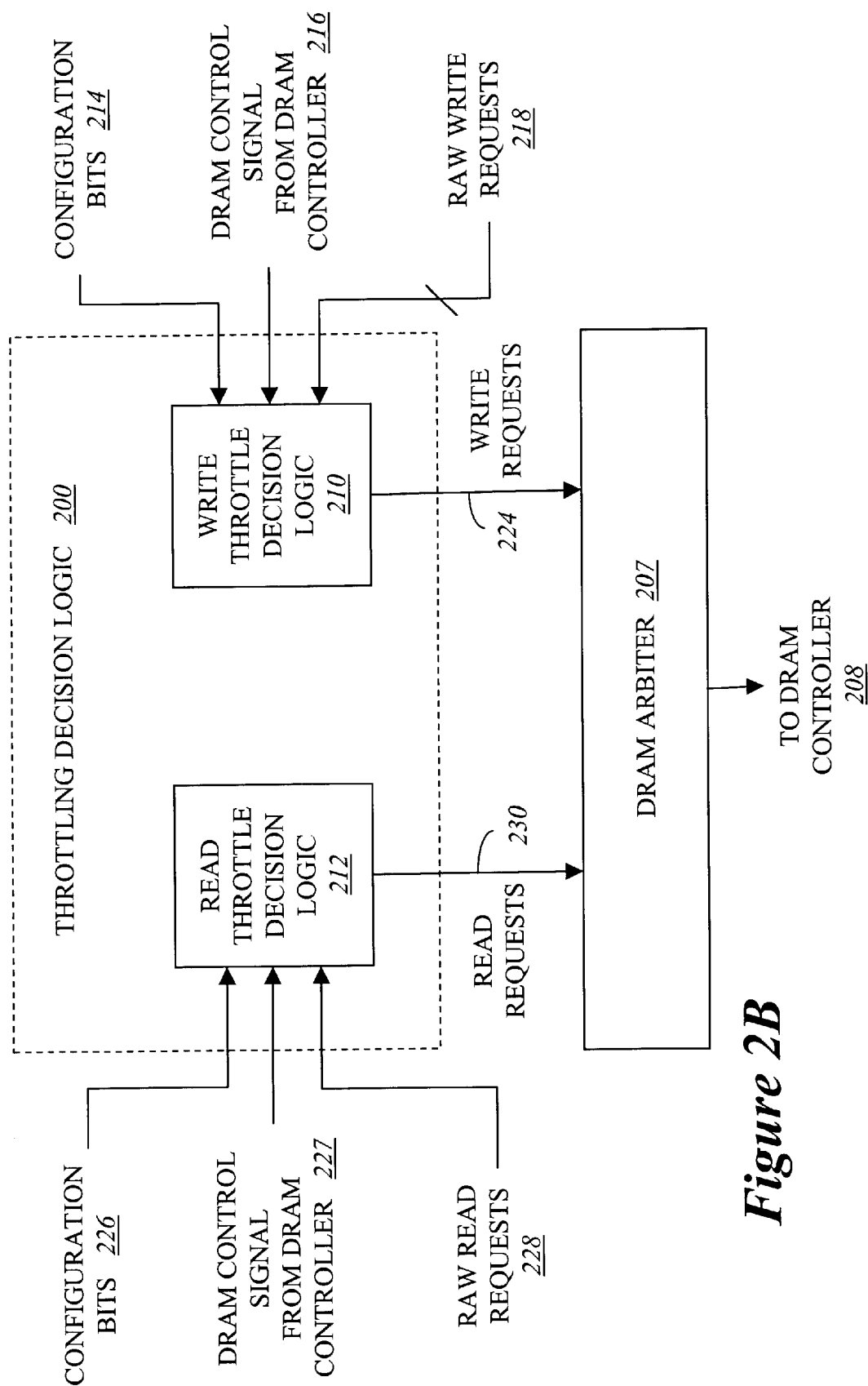
FIG. 2b is a block diagram of one embodiment of a throttling decision logic coupled to a DRAM arbiter of the memory controller.

FIG. 2b is a block diagram of one embodiment of throttling decision logic 200 coupled to the DRAM arbiter in more detail. Throttling decision logic 200 has a write throttle decision logic 210 and a read throttle decision logic 212.

One or more configuration bits are used by write throttle decision logic 210 to monitor write requests to the system memory and generate signals to DRAM arbiter 207 to limit the write requests to be processed when the write access rate has reached a predetermined threshold. Configuration bits 214 are predefined values used to determine whether the write throttle should be enabled. Various registers which are the source of the configuration bits are illustrated in the block diagram of FIG. 3b.

A DRAM control signal 216 from DRAM controller 208 of FIG. 2a provides write throttle decision logic 210 with the number of quad words (QW) written to the system memory. Write requests 218 from the CPU, the AGP device and/or the PCI devices are provided to write throttle decision logic 210 to be masked and passed on to DRAM arbiter 207 by write request line 224 if write throttling is to be enabled. Otherwise, write requests 218 are passed on to DRAM arbiter 207 without change through write request line 224.

A DRAM control signal 227 from DRAM controller 208 of FIG. 2a provides the number of QW reads made to the system memory to read throttle decision logic 212. Read requests 228 from the CPU, the AGP device and/or the PCI devices are provided to read throttle decision logic 212 to be masked if the read throttle is to be enabled. Otherwise, read requests 228 are forwarded to DRAM arbiter 207 unchanged through read request line 230.

Figure 3A:
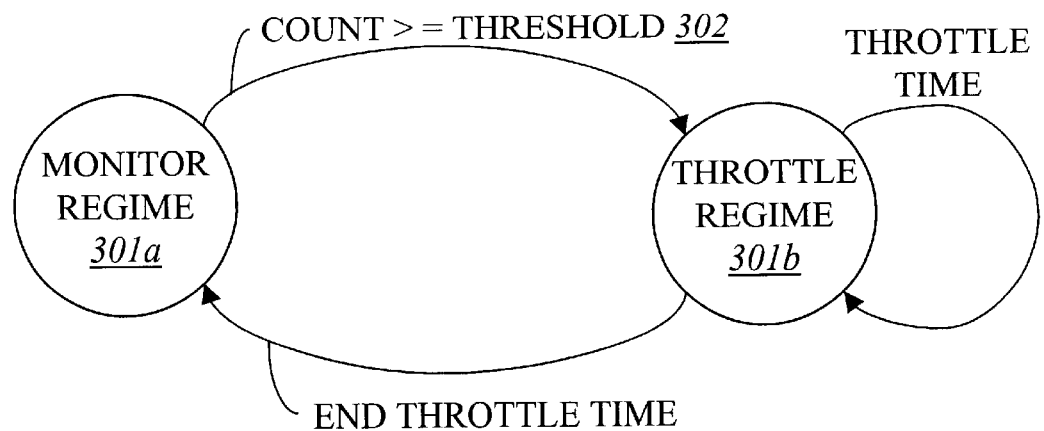
FIG. 3a illustrates the two states of one embodiment of the throttling decision logic.

FIG. 3a illustrates the two regimes of one embodiment of throttling decision logic 200 of FIGS. 2a and 2b. One regime is a monitor regime 301a and the other is a throttle regime 301b.

In the monitor regime 301a, the throttling decision logic monitors the usage of data access rate to and from the system memory through memory controller 106. If the access rate crosses certain thresholds, the throttling decision logic enters a throttle regime 301b for a specified period. Otherwise, the throttling decision logic remains in the monitor regime 301a.

While in the monitor regime 301a, a sampling window is defined during which the access rate to the system memory is monitored. During the sampling window, the accesses to the system memory are counted. At the end of the sampling window, the total number of accesses counted is compared to a defined threshold. For example, given a maximum bandwidth of 800 megabytes per second (MB/s) at which the thermal specification of a memory component is violated, threshold may then be defined as some lower bandwidth such as 500 MB/s. If the counted accesses exceeds the threshold (state transition 302), the function enters the throttle regime 301b. Otherwise, a new sampling is used to restart the monitor regime 301a.

In the throttle regime 301b, the throttling decision logic actively limits the access rate to a defined limit that guarantees that the thermal specification is not violated for the memory controller (e.g., the rated maximum temperature is not exceeded). More specifically, in the throttle regime 301b, the throttling decision logic determines that the data access rate must be throttled and sends the DRAM arbiter a mask write or a mask read request to limit the access rate for a defined period of time.

The throttle regime 301b specifies the throttling time. The throttling time may be an integer multiple of a given sampling window. In one embodiment, each throttling time is in the order of seconds and is further divided into throttling windows which are in the order of microseconds (for example ten microseconds). For each throttling window, there is a maximum quad-word (QW) value provided which designates the number of accesses that may be performed. More access requests to system memory are blocked by the DRAM arbiter for the remaining duration of the throttling window. The ratio of access budget to throttling windows effectively controls the access rate to guarantee that the die temperature of the core logic components remains controlled.

Figure 3C:
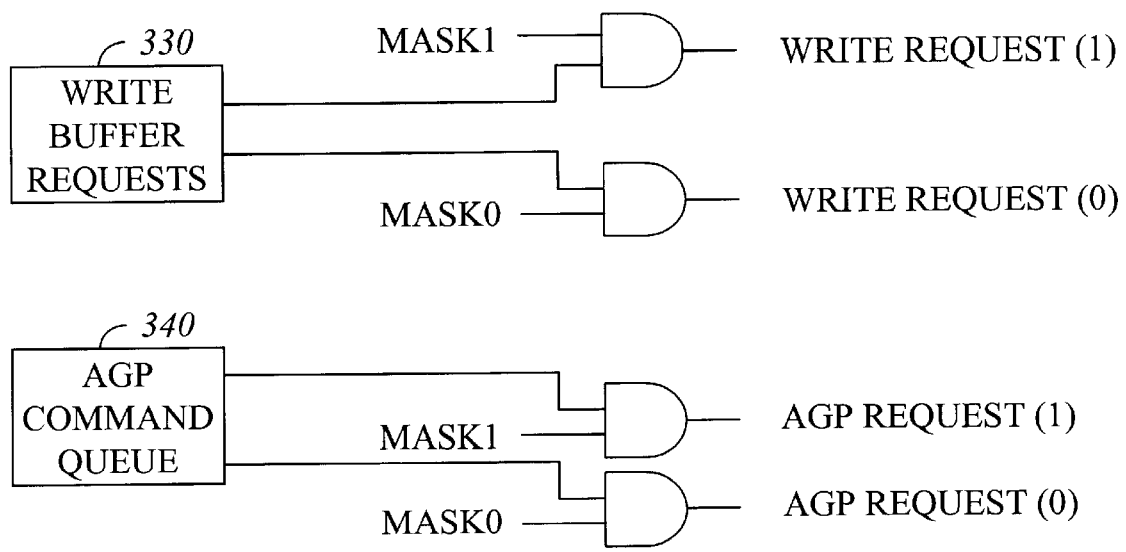
FIG. 3c illustrates the masking of read and write requests.
Figure 3B:
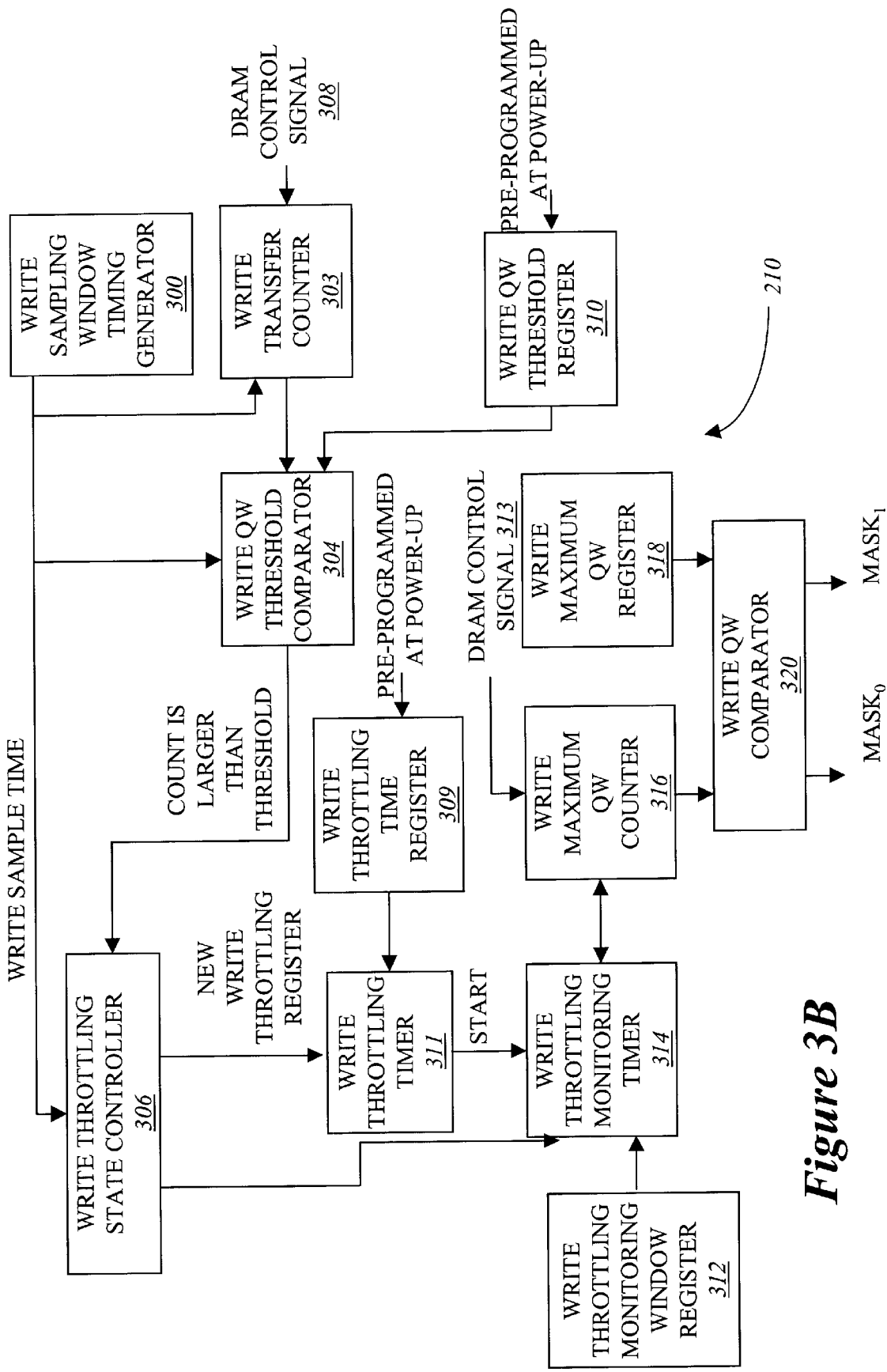
FIG. 3b is a block diagram of one embodiment of the throttling decision logic.

FIG. 3b illustrates one embodiment of the throttling decision logic of the memory controller which generates signals input to the DRAM arbiter to limit the number of data requests to be supported and to limit the duration of the support to prevent thermal violation of the core logic components. Although the block diagram illustrated in FIG. 3b is illustrated for write data requests only, a person skilled in the art may appreciate from the detailed description provided herein that read data requests may also be processed in substantially the same manner as illustrated in the block diagram.

The throttling decision logic remains in the monitor regime until the throttling function is enabled. While in the monitor regime, the write sampling time stored in the write sampling window timing generator and register 300 is fed into a write transfer counter 303, a write quad word (QW) threshold comparator 304 and a write throttling state controller 306.

The write sampling window timing generator and register 300 has a predetermined duration such as one second pre-programmed into its register. The duration may be hardwired. The predetermined duration is a time period within which a sampling window samples the number of data requests being made to the system memory through memory controller 136 of FIGS. 1c and 2a. More generally, the throttling decision logic monitors the amount of read/write traffic that is generated to the system memory.

The write transfer counter 303 monitors DRAM control signal 308 which indicates the number of data units being transferred to the system memory. In one embodiment, these data units are quad-words (QW). A write QW threshold register 310 is pre-programmed at power up of the computer system by the computer system's boot program (not shown) with a QW threshold of the memory controller. Thus, each time a computer is started or "booted up" using a boot program, a predetermined QW threshold is copied into the write QW threshold register 310 by the boot program. Pre-programming registers using a boot program is well known in the art.

The write QW threshold is selected based on the computer system's bandwidth threshold which guarantees that the memory controller temperature is kept under the specified value. For example, if the sampling window is 1 second and the maximum sustained bandwidth is 500 megabytes (MB) per second, then the desired threshold is 500 divided by 8 which is 62.5 maximum QW per second.

The size of the sampling window is made based on the temperature gradient resulting from the change of bandwidth from some steady state to a maximum bandwidth. For example, if the temperature gradient is 10C/second, the steady state temperature is 105 C. and the maximum specified temperature is 115 C., then the sampling window is set to 1 second.

At the end of the write sampling window, the write QW threshold comparator 304 compares the number of write data transfers being made as counted by the write transfer counter 303 against the thermal threshold data rate as stored in the write QW threshold register 310. If the number of write data transfer that was counted by the write transfer counter 303 within a write sampling time (as is designated by write sampling window timing generator and register 300) is greater than or equal to the QW threshold data rate given by the write QW threshold register 310, then write QW threshold comparator 304 signals write throttling state controller 306 to begin a new write throttle regime. Otherwise, the write throttling logic monitors new write transfers in a monitor regime.

Write throttling state controller 306 then initiates a new write throttle regime and notifies write throttling timer 311 to access a write throttling time period stored in a write throttling time register 309. The write throttling time period is pre-programmed at power up of the computer system. Further, in one embodiment, the write throttling time is selected in a manner that optimizes the relationship between the throttling factor and the throttling duration.

In general, the longer the throttling time, the lower throttling has to be used. It is desirable for the throttling ratio to be as low as possible to reduce or even minimize its effect on system operation and performance. Further, it is desirable to have the smallest possible throttling time to allow the system to return to the monitor regime and re-assess the need for throttling. Thus, there is a point at which the effect on system operation is minimal but yet the throttling time is small enough to provide sufficient granularity for monitoring the traffic to the system memory.

For example, let K be the ratio between the sampling window and throttling time and let T.BW be the allowed bandwidth during a throttle regime. Further, assume that the required sustained bandwidth is 500 megabytes per second (MB/S), and assume a maximum bandwidth of 800 MB/S when a throttling threshold is exceeded. With the given quantities, the following equation is maintained:

$$500 \text{ MB/S} = \frac{T \cdot BW \times K + 800 \text{ MB/S}}{K+1}$$

or:

$$T \cdot BW = \frac{500(K+1) - 800}{K}$$

where

| | |
|---|---|
| K = 1 | T.BW = 200 MB/S |
| K = 2 | T.BW = 350 MB/S |
| K = 3 | T.BW = 400 MB/S |
| . | |
| . | |
| . | |
| K = 63 (maximum) | T.BW = 500 MB/S |

To achieve a given average bandwidth that guarantees the desired component temperature, throttling may be performed deeper for a short time or less deeply for a longer time. As was illustrated above, assuming that the maximum bandwidth is 800 MB/second and the desired sustained bandwidth is 500 MB/second. If the sampling period is set to 1 second, the desired sustained bandwidth may be achieved by throttling for a period of 1 second down to 200 MB/second or throttle for 2 seconds (K=2) at 350 MB/second (T.BW=350 MB/S).

Once write throttling state controller 306 initiates a new write throttling regime, a write throttling monitoring timer 314 is signaled by write throttling state controller 306 and write throttling timer 311 to begin a new write throttling monitoring time. Write throttling monitoring timer 314 begins counting the time period designated by a write throttling monitoring window register 312.

Thus, both write throttling timer 311 and write throttling monitoring timer 314 begin counting a pre-determined time period. Hence, in one embodiment, for each one unit of write throttling timer 314, there are multiple write throttling monitoring windows. For example, for every one second of a write throttling monitoring time, there may be multiple write throttling monitoring windows with a duration of ten microseconds each.

The present invention's throttling is based on limiting the amount of data transfers allowed to be performed during a given time period. If a budget of transfers is allocated to a throttling time of typically one or more seconds, the transfers may have to be masked for a time duration of portions of a second or more. Long delays (or latency) in executing cycles cause certain system operation failures. For example, operating systems are sensitive to such long delays as it attempts to measure time in sub-second units. In one embodiment, the operating system typically measures time eighteen times in a second, or once every 55 microseconds. The present invention allocates smaller budgets to a smaller time unit in such an order (for example, in the order of micro-seconds) that basic system operation will not be impacted.

A write maximum QW counter 316 receives the DRAM control signal 313 that designates the number of write data transfers occurring during each write throttling monitoring window. A write maximum QW register 318 contains a maximum unit of write data transfer (quad word) which is compared to the accumulated write data transfer as counted by write maximum counter 316. If the accumulated maximum QW as counted by write maximum QW counter 316 is greater than or equal to write maximum QW stored in the write maximum QW register 318, then a write maximum QW comparator 320 outputs a write mask control to the DRAM arbiter.

In one embodiment, for each and every write throttle monitoring window, a budget of a write maximum QW is allocated to be performed. If more write requests are introduced within the same write throttling monitoring window, the write requests are blocked by the DRAM arbiter and will not be executed until the end of the current write throttling monitoring window.

The write maximum QW is selected in accordance with the throttle monitoring window and based on the bandwidth desired while throttling. For example, if the throttle window is selected to be 10 micro-seconds and the desired throttle bandwidth is 350 MB/second, then the selected write maximum QW is approximately 437 quad words (QW).

As mentioned earlier, the read data transfers are processed in the same manner as the write data transfers. More specifically, a read sampling window is a time period during which a read transfer counter monitors the amount of read traffic that is generated to the system memory. The read sampling window is associated with the monitor regime. At the end of the read sampling window, the accumulated number of QW reads from the system memory is compared to a predetermined read QW threshold.

If the accumulated number of QW is greater than the read QW threshold, then there is a need to throttle the read requests and the throttle regime is entered. Otherwise, the present invention will again monitor read requests.

Once there is a need to throttle read requests, the DRAM controller enters the throttle regime. The DRAM controller will remain in the throttle regime for a duration of a predetermined read throttling time stored in a read throttling time register. In one embodiment, the throttle regime is further divided into a plurality of read throttle monitoring windows. For example, if a read throttling time is a few seconds, the read throttle monitoring window may be set to ten microseconds.

Finally, for each and every read throttling monitoring window, the present invention allocates a budget of read maximum QW to be performed. If more read requests are introduced in the same read throttling monitoring window, the requests are blocked by the DRAM arbiter and will not be executed until the end of the current read throttle monitoring window.

FIG. 3c illustrates the masking of read and write requests performed in the throttling decision logic prior to the masked requests being input to the DRAM arbiter. Write buffer request 330 is fed into two AND gates along with a mask one (1) for masking pending write buffer requests and mask zero (0) for masking current write buffer requests. An input of one is made for the respective masks when throttling is disabled and an input of zero is made for the respective masks when throttling is enabled. The respective write requests are then passed on to the DRAM arbiter. Similarly, given an AGP command queue 340, the inputs are provided to AND gates which also accept a mask one (1) for pending AGP command queue requests and mask zero (0) for current AGP command queue requests. The respective AGP requests are then forwarded to the DRAM arbiter. Other masking schemes may be employed and would be apparent to those skilled in the art.

Figure 4A:
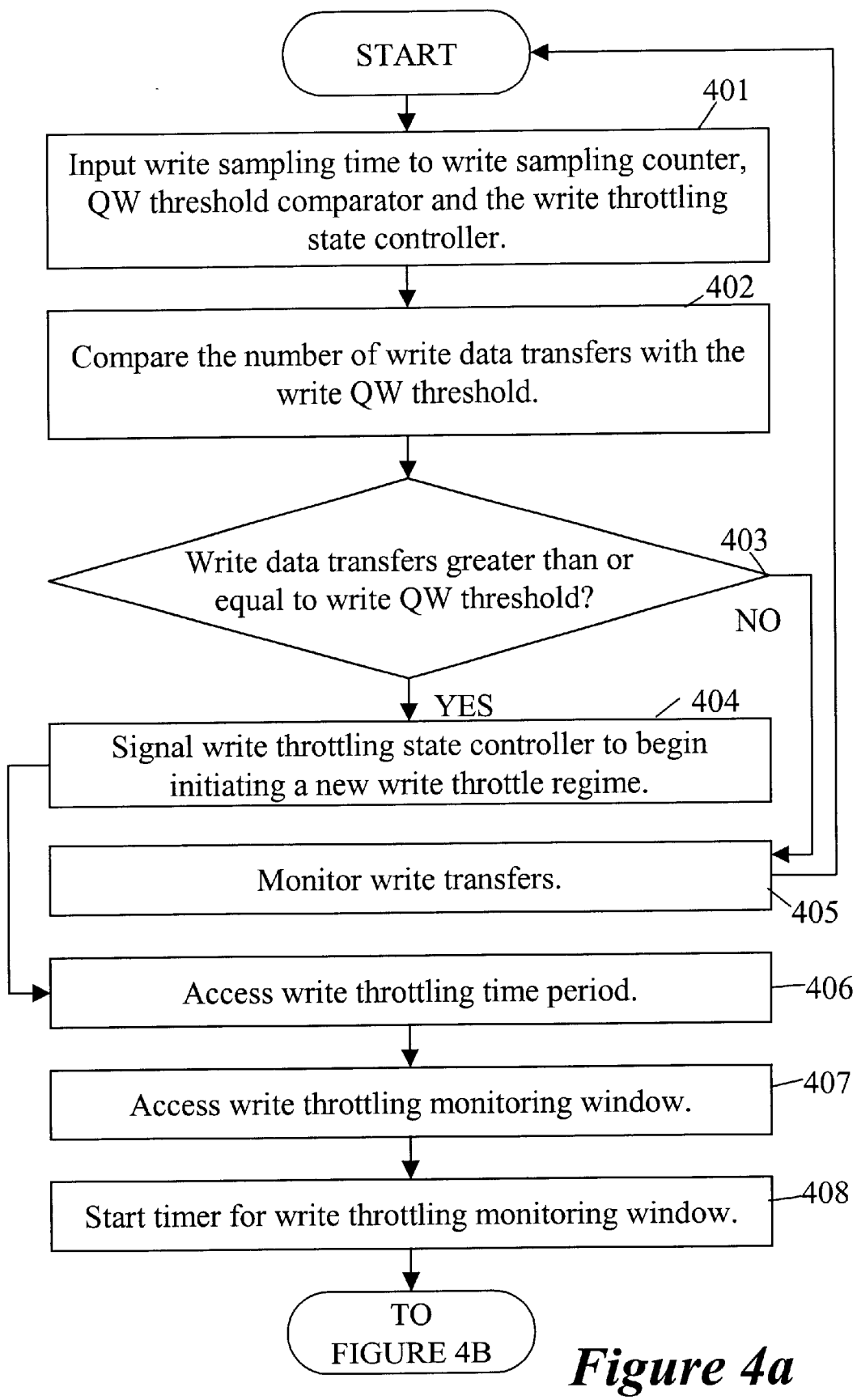
FIGS. 4a and 4b are flow diagrams illustrating the general steps followed by one embodiment of the present invention for controlling core logic temperature.
Figure 4B:
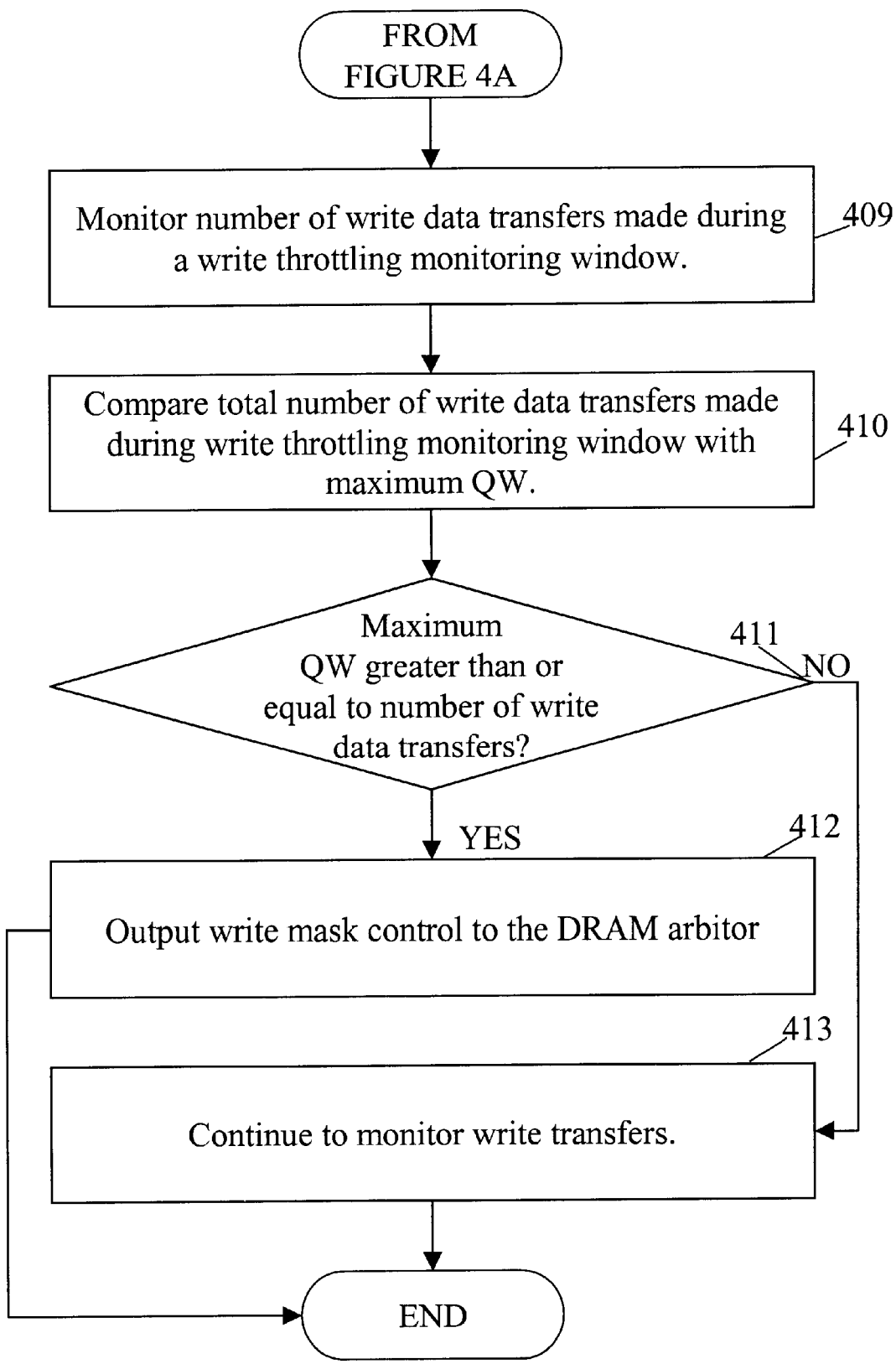

FIGS. 4a and 4b are flow diagrams illustrating the general steps followed by one embodiment of the present invention. The flow diagrams illustrated in FIGS. 4a and 4b are illustrated for write data requests; however, read data requests may also be processed in the same manner as illustrated in the flow diagrams.

In block 401, the write sampling time stored in write sampling window timing generator and register 300 (FIG. 3b) is fed into a write transfer counter 302, a write quad word (QW) threshold comparator 304 and a write throttling state controller 306 (FIG. 3b). The write transfer counter 302 counts the number of write requests being supported by the memory controller during the write sampling window.

In block 402, at the end of the write sampling window, the write QW threshold comparator 304 (FIG. 3b) compares the number of write data transfers that are counted by the write transfer counter 303 (FIG. 3b) against the thermal threshold data rate as stored in a write QW threshold register 310 (FIG. 3b). In block 403, if the number of write data transfer that is counted by write transfer counter 303 (FIG. 3b) during the write sampling window is greater than or equal to the QW threshold given by the write QW threshold register 310 (FIG. 3b), then in block 404, write QW threshold comparator 304 (FIG. 3b) signals write throttling state controller 306 (FIG. 3b) to initiate a new write throttle regime. Otherwise, in block 405, write throttling decision logic will again monitor write transfers.

In block 406, write throttling state controller 306 (FIG. 3b) enters a new write throttle regime and notifies write throttling timer 311 (FIG. 3b) to access a write throttling time period stored in a write throttling time register 309 (FIG. 3b). In block 407, write throttling monitoring timer 314 (FIG. 3b) is signaled by write throttling state controller 306 (FIG. 3b) and write throttling timer 311 (FIG. 3b) to access a write throttling monitoring time from a write throttling monitoring window register 312. In block 408, the write throttling monitoring timer 314 (FIG. 3b) begins counting the time period designated by write throttling monitoring window register 312 (FIG. 3b).

In block 409, write maximum QW counter 316 (FIG. 3b) receives DRAM control signal 313 that designates the number of write data transfers occurring during each write throttling monitoring widow. In block 410 the maximum unit of data write transfer in a write maximum QW register 318 (FIG. 3b) is compared to the accumulated write data transfer as counted by a write maximum QW counter 316 (FIG. 3b). In block 411, if the accumulated maximum QW as counted by write maximum QW counter 316 (FIG. 3b) is greater than or equal to the write maximum QW stored in write maximum QW register 318 (FIG. 3b), then in block 412 a write maximum QW comparator 320 (FIG. 3b) outputs a write mask control to mask the write requests to the DRAM arbiter. Otherwise, in block 413 the throttling decision logic will again monitor the write transfers.

Figure 5:
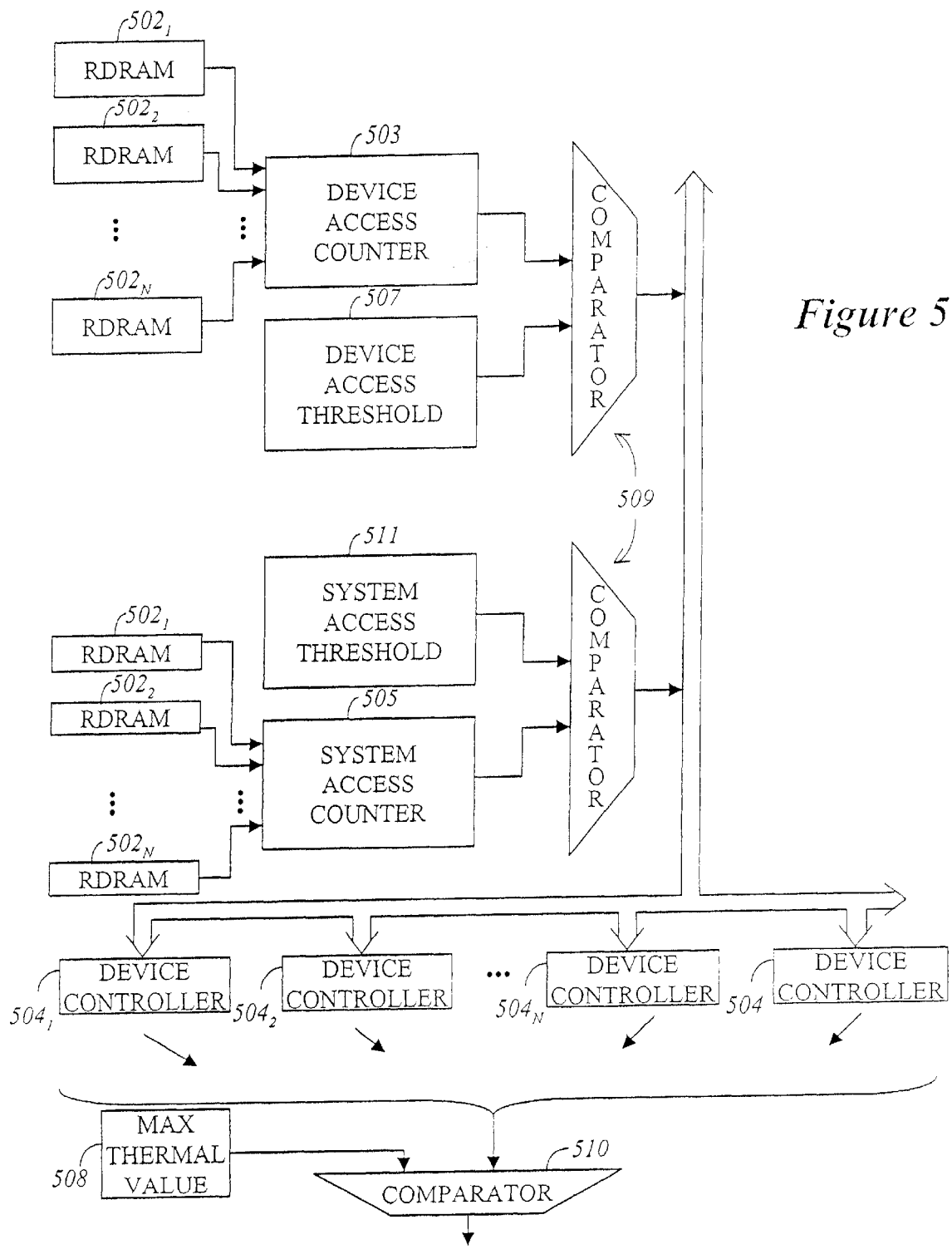
FIG. 5 is a block diagram illustrating the active management of Rambus Dynamic Random Access Memory (RDRAM) devices in a system.

FIG. 5 is a block diagram illustrating the active management of Rambus Dynamic Random Access Memory (RDRAM) devices in a system. More specifically, the figure illustrates a method implemented in a memory controller for actively managing power consumed by a RDRAM device in operation. A RDRAM device can consume up to 2.0 watts during data transfers. If the heat generated by the RDRAM device is not removed properly by the system, the RDRAM internal temperature will rise beyond the maximum tolerated by the device and the device will eventually fail. The present invention illustrated in FIG. 5 prevents such failure by detecting that a device is about to cross over a predetermined thermal threshold and perform corrective action.

Although the dedicated device counters are illustrated for each device, in an alternate embodiment, the invention may be implemented with one common counter and dedicated registers. The threshold registers are used for holding the programmable threshold values.

In the illustrated embodiment, RDRAM memory controller 500 actively manages the power consumed by a RDRAM device 502 by monitoring the number of accesses to that device during a sample period (for each device) in a sampling window. The number of accesses to each RDRAM device is counted by a device access counter 503 during a sampling period. The number of accesses to the system is counted by a system access counter 505 during a sampling window.

RDRAM memory controller 500 monitors the read/write activities to a RDRAM device 502 in order to limit the power dissipated during a sampling period. When the sampling period expires, the RDRAM memory controller 500 begins to monitor the next RDRAM device 502. In one embodiment, all of the RDRAM devices 500 are monitored in a round robin order during a sampling window.

During a sampling window, the number of read/write accesses to an RDRAM device 502 and the number of read/write accesses to all other RDRAM devices in the channel are counted. If the number of access during a sampling period to an RDRAM device is more than a predetermined device access threshold (DAT) value 507 as compared by a comparator 509, a device counter value (DCV) of a device counter 504 is incremented by one. If the number of access is less than or equal to the DAT value 507, then the DCV is decremented by one. Similarly, the number of accesses to all other devices in the channel are counted and compared by the comparator 509 to a system access threshold (SAT) 511. A system counter value (SCV) of a system counter 506 is incremented or decremented according to the comparison result.

Once the DCV for each device counter 504 and the SCU is tabulated, the DCV is compared to a maximum thermal value (DMTV) 508 by a comparator 510. If the DCV is more than the programmed DMTV 508, then corrective action is taken on that device. If SCV is more than the programmed system maximum thermal value (SMTV) 512, then corrective action is taken on all devices except the device whose sampling period just ended. The corrective action is to delay one or more command packet(s) (e.g., secondary control packets) going to that particular device by a multiple of 10 ns. The corrective action lasts until the DCV (SCV) comes down to minimum thermal values specified by the DTV and STV. The sampling period and sampling window values are programmable through configuration registers.

The intended advantage of the mechanism for active power management of RDRAM devices in a system illustrated in FIG. 5 is to provide a low cost mechanism for monitoring and regulating the power consumed by any individual RDRAM in a system with minimum performance loss compared to other schemes. Additionally, the mechanism is intended to pin point the RDRAM device that is about to cross a predetermined thermal limit and thus provide the opportunity for corrective action prior to actual cross over.

Figure 6:
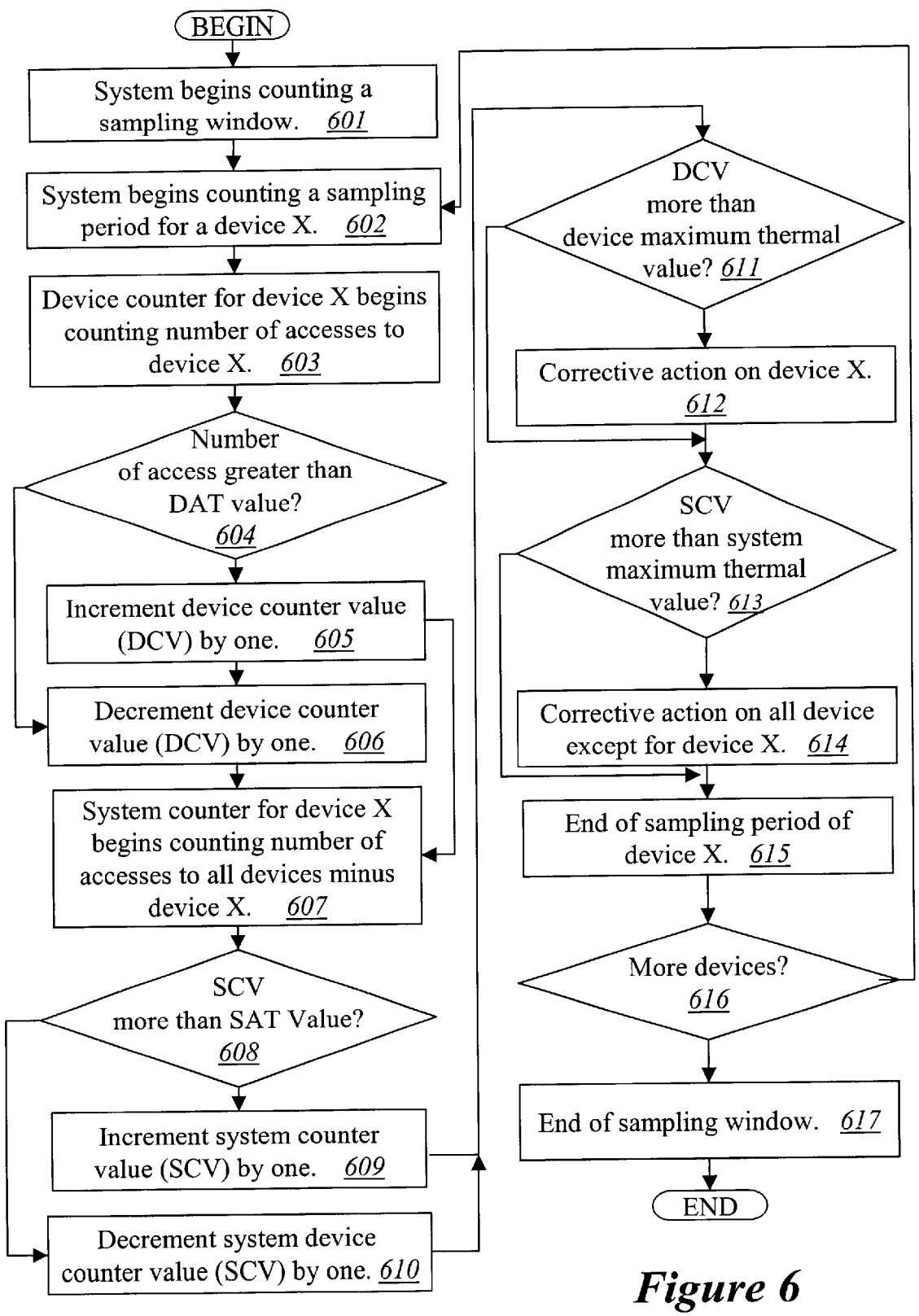
FIG. 6 is a flow diagram illustrating the general steps followed in the active management of RDRAM devices in a system.

FIG. 6 is a flow diagram illustrating the general operations followed in the active management of RDRAM devices in a system. RDRAM is a type of memory (DRAM) developed by Rambus, Inc. of Mountain View, Calif. Whereas the fastest current memory technologies used by Personal Computers (PC)'s (SDRAM) can deliver data at a maximum speed of about 100 MHz, RDRAM transfers data at up to 600 MHz.

In block 601, the system begins counting a sampling window. In block 602, the system begins counting a sampling period for a given device X. In block 603, a device X counter begins counting the number of accesses to device X. In block 604, if the number of accesses to device X is more than a predetermined device access threshold (DAT) value, then in block 605, the device X counter is incremented by one. In block 604, if the number of accesses to device X is less than or equal to the DAT value, then in block 606 the device X counter is decremented by one. In block 607, the system counter counts the number of accesses to all devices minus device X.

In block 608, if the number of accesses counted by the system counter is more than a system access threshold (SAT) value, then in block 609 the system counter value is incremented by one. In block 608, if the number of accesses counted by the system counter is less than or equal to the SAT value, then in block 610 the system counter value is decremented by one. In block 611, if the device counter value (DCV) is greater than the device maximum thermal value (DMTV), then in block 612 corrective action is taken on device X.

In block 613, if the system counter value (SCV) is greater than the system maximum value (SMTV), then corrective action is taken on all devices except device X. In block 614, the end of the sampling period for device X is reached. The flow returns to block 602, where a sampling period of a second device is started. The acts are repeated until all devices in the channel are processed. In block 615, if there are no more devices to process, then in block 616 the sampling window is completed.

Figure 7:
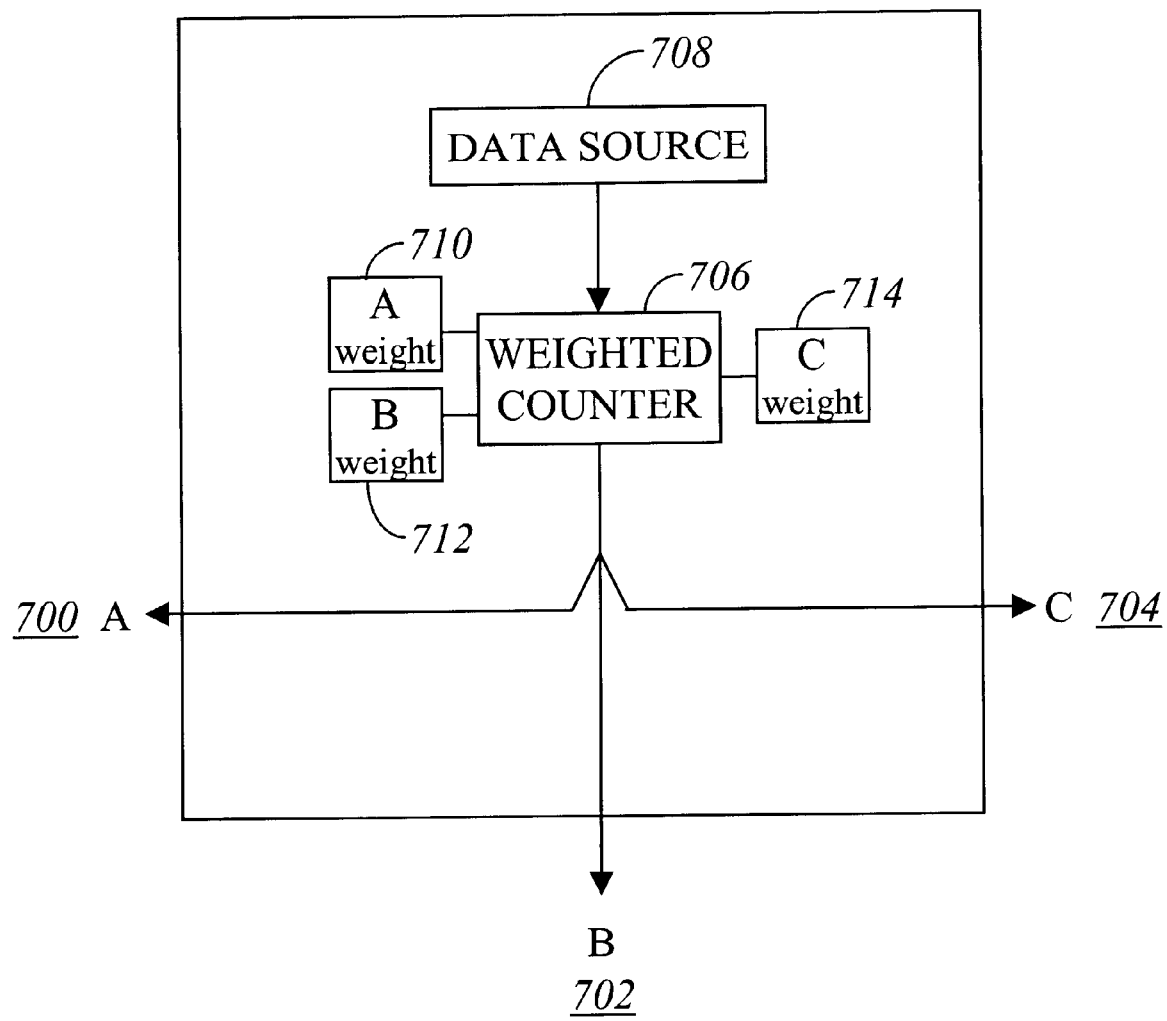
FIG. 7 is a block diagram of one embodiment of the invention implemented with a weighted counter.

FIG. 7 is a block diagram of one embodiment of the invention implemented with a weighted counter. A chipset typically has several groups of I/O interfaces. The package and die temperatures can be predicted by summing the power dissipated by the various I/O interfaces. In the previously described embodiments, the throttling mechanism consisted of a simple counter. The counter assumed that all I/O interfaces dissipated the same amount of power per unit I/O. The counter monitored the amount of I/O traffic being driven from the chip over a period of time. When the value of the counter exceeded a programmed limit the I/O traffic was halted or other corrective action was taken. For example, a chipset that has 3 I/O interfaces; A 700, B 702, and C 704 as illustrated in the figure. Based on calculations it may be determined that when 300 MB/s of traffic is driven on interface C 704 the package and die thermal limits are reached. The throttle counter limit must therefore be set to 300 MB/s to keep the package temperature within its limit.

More specifically, for a given amount of I/O traffic each I/O interface dissipates a different amount of power depending frequency, voltage swing and load impedance. The I/O power dissipated by each I/O interface can be calculated based on the interface characteristics and the amount of I/O traffic being driven out from the interface.

Given that analysis indicates that for a given unit of I/O traffic interface B 702 dissipates twice as much power as interface A 700, and interface C 704 dissipates 3 times as much power as interface A 700, the illustrated embodiment processes data access between a data source 708 and the I/O interfaces by weighting the respective I/O interfaces. For example, based on calculations it may be determined that when 300 MB/s of traffic is driven on interface C 704 the package and die thermal limits are reached. Note however that interface A 700 dissipates ⅓ the power per I/O unit as compared to interface C 704. This means that 900 MB/s of traffic could be driven out of interface C 704 before the package thermal limit is reached. With a counter that weights all interface traffic the same, the throttle counter limit would still need to be set to 300 MB/s to keep the package temperature within its limit in the event that all 300 MB/s are routed to interface C 704. Throttling would also go into effect when 300 MB/s of traffic occurs on interface A 700 even though 900 MB/s could have been allowed. This means that 600 MB/s of traffic on interface A 700 is given up due to the fact that all traffic is counted the same.

In the alternate embodiment illustrated in FIG. 7, the counter is incremented differently depending on the I/O destination of the traffic. For each unit of I/O traffic driven on interfaces A 700, B 702, and C 704, a weighted counter 706 increments by 1 (710), 2 (712), and 3 (714) respectively. In the previously described example, the throttle counter limit would be set to 900 MB/s. Since interface A 700 has a weight of one, 900 MB/s is allowed before throttling occurs. Since interface C 704 has a weight of three, only 300 MB/s (300 MB/s×3=900 MB/s) is allowed before throttling occurs. By weighting the traffic destined to the separate I/O interfaces correctly the maximum amount of traffic can be allowed on each interface. The weighting of each interface could be made programmable allowing the weight value to be changed depending on the frequency, voltage swing, and load characteristics of the interface.

What has been described is a method and apparatus to control device temperature to prevent thermal violations.

While certain exemplary embodiments have been described in detail and shown in the accompanying drawings, it is to be understood that such embodiments are merely illustrative of and not restrictive on the broad invention, and that this invention is not to be limited to the specific arrangements and constructions shown and described, since various other modifications may occur to those with ordinary skill in the art.

What is claimed is:

1. A method for controlling component temperature, the method comprising:
   determining access rate to the component;
   comparing the access rate with a predetermined threshold value, each interface of the component having a weighted value used in said comparing; and
   controlling temperature of the component by performing corrective action.

2. The method of claim 1 wherein the component is one of a data source and a RDRAM device.

3. The method of claim 1 wherein the component is a memory controller.

4. The method of claim 1 wherein the weighting of each interface is programmable.

5. The method of claim 1 further comprising:
programming the weighted value based on at least one of frequency, voltage swing and load characteristics.

6. The method of claim 5 further comprising:
counting a number of data transfer requests made to a system memory; and
pre-programming a sampling window during which the number of data transfer requests are counted.

7. The method of claim 6 further comprising pre-programming a data threshold which is an amount of data to be transferred before a potential thermal violation of the component occurs.

8. The method of claim 7 further comprising comparing the number of data transfer requests with the data threshold.

9. The method of claim 7 further comprising initiating throttling of data transfer requests if the number of data transfer requests is greater than or equal to the data threshold.

10. The method of claim 9 further comprising pre-programming a throttle time period during which the number of data transfer requests is monitored while throttling.

11. The method of claim 10 further comprising pre-programming a throttling monitoring window which is a sub-unit of the throttle time period.

12. The method of claim 11 further comprising monitoring the number of data transfers made during the throttling monitoring window.

13. The method of claim 12 further comprising pre-programming a value which designates the maximum number of data transfers allowed to be processed before a potential thermal violation occurs.

14. The method of claim 13 further comprising comparing the number of data transfers made during the throttling monitoring window with the value modified by the weighted value.

15. The method of claim 14 further comprising generating a mask control signal to mask the next data transfer request.

16. The method of claim 13 wherein the value is a maximum data value.

17. An apparatus comprising:
a throttling decision logic to generate a mask control signal to mask data transfer requests to a component; and
a controller coupled to the throttling decision logic, the controller to generate control signals to the throttling logic indicative of processed data transfer requests.

18. The apparatus of claim 17 wherein the data transfer requests are masked component rising above a predetermined thermal specification.

19. The apparatus of claim 17 further comprising a plurality of data transfer request queues coupled to the throttling decision logic, the plurality of data transfer queues to hold data transfer requests generated by devices.

20. The apparatus of claim 19 wherein one of the devices includes a central processing unit.

21. The apparatus of claim 19 wherein one of the devices includes an accelerated graphics port.

22. The apparatus of claim 19 wherein one of the devices includes a peripheral component interconnect device.

23. The apparatus of claim 17 wherein the throttling decision logic further comprises a read throttle decision logic to generate a mask control signal to mask read data transfer requests to the component prior to the temperature of the component rising above a predetermined thermal specification.

24. The apparatus of claim 17 wherein the throttling decision logic further comprises a write throttle decision logic to generate a mask control signal to mask write data transfer requests to the component prior to the temperature of the component rising above a predetermined thermal specification.

25. The apparatus of claim 17 further comprising a sampling window timing generator to generate a sampling window which designates a time duration during which the number of data transfer requests processed is counted by monitoring the control signals designating processed data transfer requests.

26. The apparatus of claim 25 further comprising a counter coupled to the sampling window timing generator, the transfer counter to monitor the control signal to determine the number of data transfer requests processed during the sampling window.

27. The apparatus of claim 26 further comprising a data unit threshold comparator coupled to the sampling window timing generator and the transfer counter, the data unit threshold comparator to compare the number of data requests processed during the sampling window to a data unit threshold.

28. The apparatus of claim 27 further comprising a data unit threshold register coupled to the data unit threshold comparator, the data unit threshold register to hold the data unit threshold.

29. The apparatus of claim 28 further comprising a throttling state controller coupled to the sampling window timing generator and the data unit threshold comparator, the throttling state controller to initiate a throttle regime if the data unit threshold comparator determines that the number of data requests processed during the sampling window is greater than or equal to the data unit threshold.

30. The apparatus of claim 29 further comprising a throttling timer coupled to the throttling state controller, the throttling timer to count a throttling time period during which a predetermined maximum number of data transfer requests in data units are allowed to be processed through the component.

31. The apparatus of claim 30 further comprising a throttling time register coupled to the throttling timer, the throttling time register to hold a value designating the maximum number of data transfer requests in data units allowed to be processed through the component during the throttling time period.

32. The apparatus of claim 31 further comprising a throttling monitoring timer coupled to the throttling timer, the throttling monitoring timer to count a throttling monitoring window time period which is a sub-unit of the throttling time period.

33. The apparatus of claim 32 further comprising a throttling monitoring window register coupled to the throttling monitoring timer, the throttling monitoring window to hold the throttling monitoring window time period.

34. The apparatus of claim 33 further comprising a maximum data unit counter coupled to the throttling monitoring timer, the maximum data unit counter to receive the control signal designating the data transfer requests processed and count the number of the data transfer requests processed during each said throttling monitoring window of the throttling time.

35. The apparatus of claim 34 further comprising a data unit comparator coupled to the maximum data unit counter, the data unit comparator to compare the number of data transfer requests processed during each said throttling monitoring window of the throttling time to a maximum data unit value, the data unit comparator generating a mask control signal if the number of data transfer requests processed is greater than or equal to the maximum data unit value.

36. The apparatus of claim 35 further comprising a maximum data unit register coupled to the data unit comparator, the maximum data unit register to hold the maximum data unit value.

37. A system comprising:
a memory device to accept data transfer requests from various devices; and
a controller coupled to the memory device, the controller to control the temperature of the system based on the number of the data transfer requests made and to couple the various devices to the memory device to process the data transfer requests, the controller further comprises a throttling decision logic to generate a mask control signal to mask data transfer requests to the memory device prior to the temperature of the system crossing over a predetermined thermal specification.

38. The system of claim 37 wherein the controller is to generate control signals to the throttling decision logic designating processed data transfer requests.

39. The system of claim 38 further comprising a plurality of data transfer request queues coupled to the throttling decision logic, the plurality of data transfer queues to hold data transfer requests generated by the devices.

40. The system of claim 39 wherein the devices comprise a central processing unit.

41. The system of claim 39 wherein the devices comprise an accelerated graphics port.

42. The system of claim 39 wherein the devices comprise a peripheral component interconnect device.

43. The system of claim 39 wherein the throttling decision logic further comprises a read throttle decision logic to generate a mask control signal to mask read data transfer requests to the memory device prior to the temperature of the controller rising above a predetermined thermal specification.

44. The system of claim 43 wherein the throttling decision logic further comprises a write throttle decision logic to generate a mask control signal to mask write data transfer requests to the memory device prior to the temperature of the controller rising above a predetermined thermal specification.

45. The system of claim 44 further comprising a sampling window timing generator to generate a sampling window which designates a time duration during which the number of data transfer requests processed is counted by monitoring the control signals designating processed data transfer requests.

46. The system of claim 45 further comprising a transfer counter coupled to the sampling window timing generator, the transfer counter to monitor the control signal to determine the number of data transfer requests processed during the sampling window.

47. The system of claim 46 further comprising a data unit threshold comparator coupled to the sampling window timing generator and the transfer counter, the data unit threshold comparator to compare the number of data requests processed during the sampling window to a data unit threshold.

48. The system of claim 47 further comprising a data unit threshold register coupled to the data unit threshold comparator, the data unit threshold register to hold the data unit threshold.

49. The system of claim 48 further comprising a throttling state controller coupled to the sampling window timing generator and the data unit threshold comparator, the throttling state controller to initiate a throttle regime if the data unit threshold comparator determines that the number of data requests processed during the sampling window is greater than or equal to the data unit threshold comparator.

50. The system of claim 49 further comprising a throttling timer coupled to the throttling state controller, the throttling timer to count a throttling time period during which a predetermined maximum number of data transfer requests in data units are allowed to be processed through the controller.

51. The system of claim 50 further comprising a throttling time register coupled to the throttling timer, the throttling time register to hold a value designating the maximum number of data transfer requests in data units allowed to be processed through the controller during the throttling time period.

52. The system of claim 51 further comprising a throttling monitoring timer coupled to the throttling timer, the throttling monitoring timer to count a throttling monitoring window time period which is a sub-unit of the throttling time period.

53. The system of claim 52 further comprising a throttling monitoring window register coupled to the throttling monitoring timer, the throttling monitoring window to hold the throttling monitoring window time period.

54. The system of claim 53 further comprising a maximum data unit counter coupled to the throttling monitoring timer, the maximum data unit counter to receive the control signal designating the data transfer requests processed and count the number of the data transfer requests processed during each the throttling monitoring window of the throttling time.

55. The system of claim 54 further comprising a data unit comparator coupled to the maximum data unit counter, the data unit comparator to compare the number of data transfer requests processed during each said throttling monitoring window of the throttling time to a maximum data unit value, the data unit comparator generating a mask control signal if the number of data transfer requests processed is greater than or equal to the maximum data unit value.

56. The system of claim 55 further comprising a maximum data unit register coupled to the data unit comparator, the maximum data unit register to hold the maximum data unit value.

* * * * *